US009321942B2

(12) United States Patent
Inoue et al.

(10) Patent No.: US 9,321,942 B2
(45) Date of Patent: Apr. 26, 2016

(54) OPTICAL PRESSURE-SENSITIVE ADHESIVE, PRESSURE-SENSITIVE ADHESIVE ATTACHED OPTICAL FILM, AND IMAGE DISPLAY

(75) Inventors: Shinichi Inoue, Ibaraki (JP); Masayuki Satake, Ibaraki (JP); Kohei Yano, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 12/293,936

(22) PCT Filed: Mar. 14, 2007

(86) PCT No.: PCT/JP2007/055112
§ 371 (c)(1),
(2), (4) Date: Sep. 22, 2008

(87) PCT Pub. No.: WO2007/111138
PCT Pub. Date: Oct. 4, 2007

(65) Prior Publication Data
US 2009/0104445 A1   Apr. 23, 2009

(30) Foreign Application Priority Data

Mar. 27, 2006 (JP) ................ 2006-086044

(51) Int. Cl.
| C08G 18/04 | (2006.01) |
| C09J 133/08 | (2006.01) |
| C09J 133/26 | (2006.01) |
| C09J 133/04 | (2006.01) |
| C09J 7/02 | (2006.01) |
| C09J 133/06 | (2006.01) |
| C09D 133/26 | (2006.01) |
| C08L 33/06 | (2006.01) |
| C08L 33/08 | (2006.01) |
| C08L 33/26 | (2006.01) |
| G02B 5/30 | (2006.01) |

(52) U.S. Cl.
CPC ............ *C09J 133/04* (2013.01); *C09D 133/26* (2013.01); *C09J 7/0217* (2013.01); *C09J 133/066* (2013.01); *C09J 133/26* (2013.01); C08G 18/04 (2013.01); C08L 33/064 (2013.01); C08L 33/066 (2013.01); C08L 33/08 (2013.01); C08L 33/26 (2013.01); C09J 133/064 (2013.01); C09J 133/08 (2013.01); C09J 2203/318 (2013.01); C09J 2433/00 (2013.01); G02B 5/3033 (2013.01); G02B 5/3083 (2013.01); Y10T 428/2887 (2015.01); Y10T 428/2891 (2015.01); Y10T 428/2896 (2015.01)

(58) Field of Classification Search
None
See application file for complete search history.

(56) References Cited

U.S. PATENT DOCUMENTS

| 4,693,935 | A | * | 9/1987 | Mazurek ................ 428/352 |
| 4,874,671 | A | * | 10/1989 | Tahara et al. ............ 428/447 |
| 5,006,582 | A |   | 4/1991 | Mancinelli |
| 5,225,470 | A |   | 7/1993 | Mancinelli |
| 5,571,617 | A |   | 11/1996 | Cooprider et al. |
| 5,795,650 | A |   | 8/1998 | Watanabe et al. |
| 6,441,092 | B1 | * | 8/2002 | Gieselman ............. 525/191 |
| 6,632,906 | B1 |   | 10/2003 | Kamiyama |
| 6,994,904 | B2 | * | 2/2006 | Joseph et al. ........... 428/297.4 |
| 7,070,051 | B2 | * | 7/2006 | Kanner et al. .......... 206/382 |
| 7,285,313 | B2 | * | 10/2007 | Kim et al. ............... 428/1.55 |
| 7,846,542 | B2 | * | 12/2010 | Toyama et al. ......... 428/355 AC |
| 7,862,888 | B2 | * | 1/2011 | Toyama et al. ......... 428/354 |
| 8,709,597 | B2 | * | 4/2014 | Toyama et al. ......... 428/355 AC |
| 8,962,135 | B2 | * | 2/2015 | Inoue et al. ............ 428/355 AC |
| 2001/0019766 | A1 | * | 9/2001 | Masuda et al. .......... 428/345 |
| 2002/0185222 | A1 | * | 12/2002 | Wigdorski et al. ....... 156/330 |
| 2003/0168166 | A1 | * | 9/2003 | Wigdorski et al. ....... 156/330 |
| 2003/0215630 | A1 | * | 11/2003 | Melancon et al. ....... 428/355 AC |
| 2003/0216519 | A1 | * | 11/2003 | Heilmann et al. ....... 525/191 |
| 2004/0191510 | A1 | * | 9/2004 | Kiuchi et al. .......... 428/355 RA |
| 2005/0014879 | A1 |   | 1/2005 | Moroishi et al. |
| 2005/0084670 | A1 | * | 4/2005 | Satake et al. ........... 428/343 |
| 2005/0101740 | A1 | * | 5/2005 | Mougin ................. 525/242 |
| 2005/0197450 | A1 | * | 9/2005 | Amano et al. .......... 525/30 |
| 2005/0208736 | A1 | * | 9/2005 | Matsumura et al. ...... 438/460 |
| 2005/0261433 | A1 | * | 11/2005 | Takeko et al. .......... 525/222 |
| 2008/0213585 | A1 |   | 9/2008 | Moroishi et al. |
| 2009/0104450 | A1 | * | 4/2009 | Inoue et al. ............ 428/423.1 |
| 2009/0162577 | A1 | * | 6/2009 | Inoue et al. ............ 428/1.54 |

(Continued)

FOREIGN PATENT DOCUMENTS

| CN | 1603866 A | 4/2005 |
| EP | 0 357 229 B1 | 3/1990 |
| EP | 0 769 040 B1 | 4/1997 |
| EP | 1 165 716 B1 | 1/2002 |
| JP | 9-059580 A | 3/1997 |
| JP | 9-87593 A | 3/1997 |
| JP | 10-279907 A | 10/1998 |
| JP | 2003-165812 A | 6/2003 |

(Continued)

OTHER PUBLICATIONS http://www.sigmaaldrich.com/catalog/ProductDetail.do?lang=en&N4=697931|ALDRICH&N5=SEARCH_CONCAT_PNO|BRAND_KEY&F=SPEC (2009).*

(Continued)

*Primary Examiner* — Frank D Ducheneaux
(74) *Attorney, Agent, or Firm* — Westerman, Hattori, Daniels & Adrian, LLP

(57) ABSTRACT

An optical pressure-sensitive adhesive that is for use in pressure-sensitive adhesive attached optical films, includes an acrylic copolymer and is less likely to cause display unevenness in the peripheral portion of a display screen. An optical pressure-sensitive adhesive, comprising: an acrylic copolymer containing alkyl (meth)acrylate (a1) and N-(2-hydroxyethyl)(meth)acrylamide (a2) as a monomer unit.

17 Claims, No Drawings

(56) References Cited

U.S. PATENT DOCUMENTS

| | | | |
|---|---|---|---|
| 2010/0233466 A1* | 9/2010 | Higuchi et al. | 428/323 |
| 2012/0225997 A1* | 9/2012 | Niwa et al. | 524/850 |

FOREIGN PATENT DOCUMENTS

| | | | |
|---|---|---|---|
| JP | 2003-165965 A | | 6/2003 |
| JP | 2003-329838 A | | 11/2003 |
| JP | 2004-091500 A | | 3/2004 |
| JP | 2005325250 A | * | 11/2005 |

OTHER PUBLICATIONS

Aldrich Tg data sheet (2012).*
Aldrich Data Sheet (2014).*
Machine translation of JP 2005325250 A (2005).*
Human translation of JP 2003165965 A (2003).*
Notification of Transmittal of Translation of the International Preliminary Report on Patentability (Form PCT/IB/338) of International Application No. PCT/JP2007/055112 mailed Dec. 11, 2008.
International Preliminary Report on Patentability (PCT/IPEA/409) Dec. 11, 2008.
International Search Report of PCT/JP2007/055112, date of mailing Jun. 5, 2007.
Office Action issued on Sep. 25, 2009 in corresponding Chinese Patent Application No. 200780007842.8.
Japanese Office Action dated Apr. 19, 2011, issued in corresponding Japanese Patent Application No. 2006-086044.
Taiwanese Office Action dated Dec. 20, 2010, issued in corresponding Taiwanese Patent Application No. 096109313.
Japanese Office Action dated Sep. 30, 2010, issued in corresponding Japanese Patent Application No. 2006-086044.
Submission of Information dated May 24, 2012, issued in corresponding Japanese Patent Application No. 2011-132352, with English Translation (9 pages).
Chinese Office Action mailed May 28, 2012, issued in corresponding Chinese Patent Application 200780007842.8, with English translation.
Examination Decision on Request for Reexamination dated May 16, 2013, issued in corresponding Chinese Patent Application No. 200780007842.8, w/ English translation.
Office Action dated Jun. 21, 2013, issued in corresponding Japanese Application No. 2011-132352. With English Translation. (6 pages).

* cited by examiner

OPTICAL PRESSURE-SENSITIVE ADHESIVE, PRESSURE-SENSITIVE ADHESIVE ATTACHED OPTICAL FILM, AND IMAGE DISPLAY

TECHNICAL FIELD

The invention relates to an optical pressure-sensitive adhesive and a pressure-sensitive adhesive attached optical film therewith. The optical pressure-sensitive adhesive and the pressure-sensitive adhesive attached optical film are suitable for use in image displays such as liquid crystal displays, organic electroluminescence displays and plasma display panels. The optical film may be a polarizing plate, a retardation plate, an optical compensation film, a brightness enhancement film, or any laminate thereof.

BACKGROUND ART

A liquid crystal display indispensably requires polarizing elements disposed on both sides of a liquid crystal cell because of an image forming method adopted therein and generally polarizing plates are adhered. Besides, on a liquid crystal panel, various kinds of optical elements have been used in addition to a polarizing plate in order to improve a display quality of a display. For example, there have been used a retardation plate for coloration prevention, a viewing angle expanding film for improving a viewing angle of a liquid crystal display and a brightness enhancement film for raising a contrast of a display. The films each are collectively referred to an optical film.

A pressure-sensitive adhesive is usually employed in adhering an optical film described above to a liquid crystal cell. An optical film and a liquid crystal cell or optical films are usually adhered to each other using a pressure-sensitive adhesive therebetween in order to reduce a light loss. In such cases, a pressure-sensitive adhesive attached optical film in which a pressure-sensitive adhesive is provided in advance on one surface of an optical film as a pressure-sensitive adhesive layer is generally used because of a merit such as that no necessity arises for a drying step of fix the optical film.

Acrylic pressure-sensitive adhesives including an acrylic polymer as a base polymer are frequently used as pressure-sensitive adhesives of the pressure-sensitive adhesive attached optical films, because of their good adhesive properties, transparency and so on. Methods for crosslinking acrylic pressure-sensitive adhesives often use isocyanate crosslinking agents, and a coupling with the copolymerized functional monomers of the acrylic polymer is generally used in such methods.

Such optical films are adhered to liquid crystal cells to form liquid crystal panels, which are used and incorporated into liquid crystal displays. Liquid crystal displays have been used at first for calculators and later for watches, televisions, monitors and so on. Liquid crystal displays are placed under various conditions such as hot conditions and humid conditions and thus required to have high durability such that display quality degradation can be prevented.

When liquid crystal displays are placed under hot or humid conditions, however, display unevenness can sometimes occur in the peripheral portion of the liquid crystal panel to cause display defects. The display unevenness in the peripheral portion can be significantly found, particularly when an optical film in which a viewing angle expanding film is placed on a polarization plate is used.

In order to reduce the display unevenness in the peripheral portion, it is proposed that a pressure-sensitive adhesive composition containing a plasticizer or an oligomer component should be used for the pressure-sensitive adhesive attached optical film (see Patent Literatures 1 and 2 below). However, these pressure-sensitive adhesive compositions have a problem in which the additive such as the plasticizer or the oligomer component can be precipitated to cause defects in appearance or degradation of the pressure-sensitive adhesive in a long-time heating test.

Patent Literature 1: JP-A No. 09-87593
Patent Literature 2: JP-A No. 10-279907

DISCLOSURE OF THE INVENTION

Problems to be Solved by the Invention

An object of the invention is to provide an optical pressure-sensitive adhesive that is for use in pressure-sensitive adhesive attached optical films and so on, includes an acrylic copolymer and is less likely to cause display unevenness in the peripheral portion of a display screen.

Another object of the invention is to provide a pressure-sensitive adhesive attached optical film using such an optical pressure-sensitive adhesive. A further object of the invention is to provide an image display using such a pressure-sensitive adhesive attached optical film.

Means for Solving the Problems

The inventors have been conducted serious studies in order to solve the problems and as a result, they found the optical pressure-sensitive adhesive described below, which has led to completion of the invention.

The invention related to an optical pressure-sensitive adhesive, comprising:

an acrylic copolymer containing alkyl (meth)acrylate (a1) and N-(2-hydroxyethyl)(meth)acrylamide (a2) as a monomer unit;

and a crosslinking agent.

In the optical pressure-sensitive adhesive, the content of the N-(2-hydroxyethyl)(meth)acrylamide (a2) is preferably 0.01 to 100 parts by weight based on 100 parts by weight of the alkyl (meth)acrylate (a1).

In the optical pressure-sensitive adhesive, the acrylic copolymer preferably further comprises 50 parts by weight or less of a monomer (a3) as a monomer unit other than the components (a1) and (a2), based on 100 parts by weight of the allyl (meth)acrylate (a1).

In the optical pressure-sensitive adhesive, the monomer (a3) is preferably a carboxyl group-containing monomer. The monomer (a3) is also preferably a nitrogen-containing vinyl monomer.

The invention also related to a pressure-sensitive adhesive attached optical film, comprising:

an optical film; and a pressure-sensitive adhesive layer placed on at least one side of the optical film, the pressure-sensitive adhesive layer is formed by the above optical pressure-sensitive adhesive.

In the pressure-sensitive adhesive attached optical film, as the optical film, a polarization plate and/or a retardation plate are exemplified.

The invention also related to an image display comprising the above pressure-sensitive adhesive attached optical film.

Effects of the Invention

According to the invention, alkyl (meth)acrylate (a1), which is a main component, and N-(2-hydroxyethyl)(meth)

acrylamide (a2) as copolymerizable components are used to form an acrylic copolymer for use as a base polymer in the optical pressure-sensitive adhesive. When the optical pressure-sensitive adhesive is used in a pressure-sensitive adhesive attached optical film, display unevenness can be suppressed in the peripheral portion of a display screen, because of the effect of N-(2-hydroxyethyl)(meth)acrylamide (a2). In the optical pressure-sensitive adhesive of the invention, the component (a2) used as a monomer unit of the base polymer acts to suppress display unevenness. In contrast to the pressure-sensitive adhesive using an additive such as a plasticizer in addition to a base polymer, the optical pressure-sensitive adhesive of the invention does not cause precipitation of an additive itself so that defects in appearance or adhesive degradation can be prevented. In particular, in the case of using an optical film, in which a viewing angle expanding film is placed on a polarization plate, as an optical film of a pressure-sensitive adhesive attached optical film, the optical pressure-sensitive adhesive of the invention is preferably used to suppress display unevenness.

BEST MODE FOR CARRYING OUT THE INVENTION

The optical pressure-sensitive adhesive of the invention contains, an acrylic copolymer, which is a base polymer, including alkyl (meth)acrylate monomer (a1) and N-(2-hydroxyethyl)(meth)acrylamide monomer (a2) as a monomer unit. As used herein, "(meth)acrylate" refers to acrylate and/or methacrylate, and "(meth)" has the same meaning with respect to the invention. As used herein, therefore, "(meth)acrylamide" refers to acrylamide and/or methacrylamide.

The acrylic copolymer includes alkyl (meth)acrylate monomer (a1) unit as a main component. The alkyl group of the alkyl (meth)acrylate (a1) may have about 1 to about 18 carbon atoms, preferably 1 to 9 carbon atoms and may be a straight or branched chain. Examples of the alkyl (meth)acrylate include, but are not limited to, methyl (meth)acylate, ethyl (meth)acrylate, propyl (meth)acrylate, isopropyl (meth)acrylate, n-butyl (meth)acrylate, isobutyl (meth)acrylate, pentyl (meth)acrylate, hexyl (meth)acrylate, 2-ethylhexyl (meth)acrylate, n-octyl (meth)acrylate, isooctyl (meth)acrylate, decyl (meth)acrylate, dodecyl (meth)acylate, lauryl (meth)acrylate, stearyl (meth)acrylate, and cyclohexyl (meth)acrylate. These may be used singly or in any combination. The average number of carbon atoms in the alkyl group is preferably from 4 to 12.

The content of N-(2-hydroxyethyl)(meth)acrylamide (a2) in the acrylic copolymer is preferably 0.01 to 100 parts by weight based on 100 parts by weight of the alkyl (meth)acrylate (a1). If the content of the component (a2) is less than 0.01 parts by weight, the hydroxy group could fail to effectively function as a crosslinking reaction point with a crosslinking agent so that an insufficiently crosslinked pressure-sensitive adhesive layer could be produced from the pressure-sensitive adhesive of the invention. If the content of the component (a2) is more than 100 parts by weight, the acrylic copolymer could have an increased glass transition temperature (Tg) so that the pressure-sensitive adhesive could undesirably lose necessary flexibility. From these points of view, the content of the component (a2) is preferably from 0.05 to 30 parts by weight, more preferably from 0.07 to 5 parts by weight, based on 100 parts by weight of the component (a1).

The acrylic copolymer may also include an additional monomer component (a3) other than the components (a1) and (a2) as a monomer unit.

Examples of the component (a3) include hydroxyl group-containing monomers other than the component (a2), such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)-methyl acrylate; carboxyl group-containing monomers such as (meth)acrylic acid, carboxyethyl (meth)acrylate, carboxypentyl (meth)acrylate, itaconic acid, maleic acid, fumaric acid, and crotonic acid; acid anhydride group-containing monomers such as maleic anhydride and itaconic anhydride; caprolactone adducts of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; and phosphate group-containing monomers such as 2-hydroxyethylacryloyl phosphate.

Examples of the component (a3) also include nitrogen-containing vinyl monomers other than the component (a2). Examples of such monomers for modification include maleimide, N-cyclohexylmaleimide, N-phenylmaleimide; N-acryloylmorpholine; (N-substituted) amide monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide, and N-methylolpropane(meth)acrylamide; alkylaminoalkyl (meth)acrylate monomers such as aminoethyl (meth)acrylate, aminopropyl (meth)acrylate, N,N-dimethylaminoethyl (meth)acrylate, tert-butylaminoethyl (meth)acrylate, and 3-(3-pyrimidyl)propyl (meth)acrylate; alkoxyalkyl (meth)acrylate monomers such as methoxyethyl (meth)acrylate and ethoxyethyl (meth)acrylate; and succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, and N-acryloylmorpholine.

It is also possible to use, as the component (a3), vinyl monomers such as vinyl acetate, vinylpropionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers such as acrylonitrile and methacrylonitrile; epoxy group-containing acrylic monomers such as glycidyl (meth)acrylate; glycol acrylate monomers such as polyethylene glycol (meth)acrylate, polypropylene glycol (meth)acrylate, methoxyethylene glycol (meth)acrylate, and methoxypolypropylene glycol (meth)acrylate; and acrylate ester monomers such as tetrahydrofurfuryl (meth)acrylate, fluoro (meth)acrylate, silicone (meth)acrylate, and 2-methoxyethyl acrylate.

The component (a3) may be optionally used to modify the base polymer. One or more types of the components (a3) may be used. The content of the component (a3) is preferably 50 parts by weight or less, more preferably 30 parts by weight or less, even more preferably 20 parts by weight or less, based on 100 parts by weight of the alkyl (meth)acrylate (a1). If the content of the component (a3) is more than 50 parts by weight, the pressure-sensitive adhesive could undesirably lose flexibility.

In view of adhesive property, a carboxyl group-containing monomer, specifically acrylic acid, is preferably used as the component (a3). If a carboxyl group-containing monomer is used as the component (a3), the content of such a carboxyl group-containing monomer may be from about 0.1 to about 10 parts by weight, preferably from 0.5 to 8 parts by weight, more preferably from 1 to 6 parts by weight, based on 100 parts by weight of the alkyl (meth)acrylate (a1).

In order to suppress display unevenness in the peripheral portion of a display screen, a nitrogen-containing vinyl monomer, specifically, an N-substituted amide monomer such as N-acryloylmorpholine and N,N-dimethyl(meth)acrylamide, is preferably used as the component (a3). If a nitrogen-containing vinyl monomer is used as the component (a3), the content of such a nitrogen-containing vinyl monomer may be from about 0.1 to about 10 parts by weight, preferably from 0.5 to 8 parts by weight, more preferably from 1 to 6 parts by weight, based on 100 parts by weight of the alkyl (meth) acrylate (a1). The nitrogen-containing vinyl monomer is preferably used in combination with the carboxyl group-containing monomer.

Average molecular weight of the acrylic copolymer is not limited, but the weight average molecular weight of about 3 00,000 to 2,500,000 is preferable. The acrylic copolymer may be produced by a variety of known methods, for example, by a method appropriately selected from radical polymerization methods including a bulk polymerization method, a solution polymerization method and a suspension polymerization method. A variety of known radical polymerization initiators may be used such as azo initiators and peroxide initiators. The reaction is generally performed at a temperature of about 50° C. to about 80° C. for a time period of 1 to 8 hours. Among the above methods, the solution polymerization method is particularly preferred, and ethyl acetate, toluene, or the like is generally used as an acrylic copolymer solvent. The concentration of the solution is generally from about 20 to 80% by weight. An acrylic copolymer is also obtained as an aqueous emulsion.

In addition to the acrylic copolymer as a base polymer, the optical pressure-sensitive adhesive of the invention also includes a crosslinking agent. The crosslinking agent allows an increase in the adhesion to optical films and an increase in durability or allows, at high temperature, the achievement of reliability and the preservation of the shape of the pressure-sensitive adhesive itself. Any appropriate crosslinking agent such as an isocyanate, epoxy, peroxide, metal chelate, or oxazoline crosslinking agent may be used. One or more crosslinking agents may be used alone or in combination. The crosslinking agent preferably has a functional group capable of reacting with a hydroxyl group, and isocyanate crosslinking agents are particularly preferred.

An isocyanate crosslinking agent contains an isocyanate compound. Examples of the isocyanate compounds include: isocyanate monomers such as tolylene diisocyanate; chlorophenylene diisocyanate, hexamethylene diisocyanate, tetramethylene diisocyanate, isophorone diisocyanate; xylylene diisocyanate, diphenylmethane diisocyanate, hydrogenated diphenylmethane diisocyanate, and adduct type isocyanate compounds obtained by adding the isocyanate monomer to a polyhydroxy alcohol, for example trimethylolpropane; and urehthane prepolymer type isocyanates obtained by addition reaction of an isocyanurate compound, a burette type compound, in addition thereto a known polyether polyol, a known polyester polyol, a acryl polyol, a polybutadiene polyol, a polyisoprene polyol and the like.

Examples of the epoxy crosslinking agent include bisphenol A-epichlorohydrin type epoxy resins. Examples of the epoxy crosslinking agent also include ethylene glycol diglycidyl ether, polyethylene glycol diglycidyl ether, glycerol diglycidyl ether, glycerol triglycidyl ether, 1,6-hexanediol diglycidyl ether, trimethylolpropane triglycidyl ether, diglycidylaniline, N,N,N',N'-tetraglycidyl-m-xylylenediamine, 1,3-bis(N,N-diglycidylaminomethyl)cyclohexane, N,N,N', N'-tetraglycidylaminophenylmethane, triglycidylisocyanurate, m-N,N-diglycidylaminophenyl glycidyl ether, N,N-diglycidyltoluidine, and N,N-diglycidylaniline.

Various types of peroxides may be used as the peroxide crosslinking agent. Examples of such peroxides include di(2-ethylhexyl)peroxydicarbonate, di(4-tert-butylcyclohexyl) peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutyl peroxyisobutylate, 1,1,3, 3-tetramethylbutylperoxy-2-ethyl hexanoate, di(4-methylbenzoyl) peroxide, dibenzoyl peroxide, and tert-butylperoxyisobutylate. Above all, di(4-tert-butylcyclohexyl) peroxydicarbonate, dilauroyl peroxide and dibenzoyl peroxide are preferably used, because their crosslinking reaction efficiency is particularly good.

The amount of the crosslinking agent may be 10 parts by weight or less, preferably from 0.01 to 5 parts by weight, more preferably from 0.02 to 3 parts by weight, based on 100 parts by weight of (A) the acrylic copolymer. If the rate of the crosslinking agent amount is more than 10 parts by weight, crosslinking could undesirably proceed to reduce the adhesion.

If necessary, the optical pressure-sensitive adhesive of the invention may conveniently contain various types of additives such as tackifiers, plasticizers, fillers such as glass fibers, glass beads, metal power, or any other inorganic powder, pigments, colorants, antioxidants, ultraviolet absorbers, and silane-coupling agents, without departing from the object of the invention. The pressure-sensitive adhesive layer may also contain fine particles so as to have light diffusion properties.

The pressure-sensitive adhesive attached optical film of the invention includes an optical film and a pressure-sensitive adhesive layer that is formed with the optical pressure-sensitive adhesive on at least one side of the optical film. The pressure-sensitive adhesive layer may be provided on one or both sides of the optical film.

No specific limitation is placed on a formation method for a pressure-sensitive adhesive layer and the following methods can be used: one of which is a method in which a pressure-sensitive adhesive solution is coated on an optical film and the film is dried and another of which is a method in which a pressure-sensitive adhesive layer is transferred with a release sheet on which the pressure-sensitive adhesive layer is formed. Coating methods that can be adopted are roll coating methods such as a reverse coating method and a gravure coating method, a spin coating method, a screen coating method, a fountain coating method, a dipping method, a spray method and the like. After the pressure-sensitive adhesive solution is applied, the solvent or water may be evaporated by a drying process so that a pressure-sensitive adhesive layer with a desired thickness can be obtained.

The thickness of the pressure-sensitive adhesive layer may be appropriately determined depending on the application purpose, the adhesive strength or the like and is generally from 1 to 500 µm, preferably from 1 to 50 µm, more preferably from 1 to 40 µm, more preferably from 5 to 30 µm, particularly preferably from 10 to 25 µm. A thickness of less than 1 µm can lead to poor durability and separation or releasing can be easily caused by foaming or the like so that a poor appearance can be easily produced. The pressure-sensitive adhesive layer may be a laminate of layers different in composition, type or the like and formed on one or both sides of a polarizing plate or an optical film. The pressure-sensitive adhesive layers formed on both sides may be different in composition, type or thickness between the front and back sides of a polarizing plate or an optical film.

The pressure-sensitive adhesive layer containing the acrylic copolymer may also be formed by applying UV-curable pressure-sensitive adhesive syrup onto a release film and irradiating the syrup with irradiation such as UV or electron beam. In this case, the pressure-sensitive adhesive contains a crosslinking agent so that reliability or retention of the shape of the pressure-sensitive adhesive itself can be achieved at high temperature.

The pressure-sensitive adhesive layer may be crosslinked in the drying or UV irradiation process. Alternatively, another crosslinking mode may also be chosen, in which aging by warming or standing at room temperature is performed so as to facilitate crosslinking after the drying.

Examples of constituent materials of a release sheet include: proper thin items such as paper; synthetic resin films made of polyethylene, polypropylene, polyethylene terephthalate; a rubber sheet, paper, cloth, unwoven fabric, net, a foam sheet and a metal foil, and a laminate thereof. In order to enhance releasability from a pressure-sensitive adhesive layer, a release treatment imparting a low adherence, such as a silicone treatment, a long chain alkylation treatment or a fluorination treatment, may be applied onto a surface of a release sheet when required.

In the process of forming the pressure-sensitive adhesive layer and so on, the optical film may be subjected to an activation process for improving interlayer adhesion. Various methods may be used for the activation process, and specifically, surface treatment such as corona discharge treatment, plasma discharge treatment, glow discharge treatment, and low-pressure UV treatment, or saponification may be performed. Alternatively, a coupling agent or the like may be used to form an anchor layer.

In addition, in the invention, ultraviolet absorbing property may be given to the above-mentioned each layer of the pressure-sensitive adhesive attached optical film of the invention, such as the optical film, and the pressure-sensitive adhesive layer etc., using a method of adding UV absorbents, such as salicylic acid ester type compounds, benzophenol type compounds, benzotriazol type compounds, cyano acrylate type compounds, and nickel complex salt type compounds.

An anchor layer other than the above may be formed between the optical film and the pressure-sensitive adhesive layer. No specific limitation is imposed on a material made of the anchor coat layer inserted between the pressure-sensitive adhesive layer attached optical film of the invention and the optical film, while preferable is a material, showing good adherence to both the pressure-sensitive adhesive layer and the optical film, and forming a film excellent in cohesive force. Examples of materials showing such properties include: various kinds of polymers, a sol of a metal oxide, silica sol and the like. Among them, especially preferably used are polymers.

Examples of the polymers include: a polyurethane-based resin, a polyester-based resin and polymers each include an amino group in a molecule. States in use of the polymers may be any of a solvent-soluble type, a water-dispersion type and a water-soluble type. Examples thereof include: a water-soluble polyurethane; a water-soluble polyester; and a water-soluble polyamide; and water-dispersion type resins (an ethylene-vinyl acetate-based emulsion, a (meth)acrylic-based emulsion and the like). Besides, water-dispersion types include: emulsions of various kinds of resins such as polyurethane, polyester, polyamide and the like obtained by using an emulsifying agent, emulsions of the resins obtained from self-emulsifiable resins obtained by introducing an anion group, a cation group or a nonion group each of a water-dispersible hydrophillic group into the resins and the like. Besides, an ionic polymer complex can be used.

Such polymers are preferably polymers each containing a functional group having reactivity with an isocyanate compound in a pressure-sensitive adhesive. The polymers are preferably polymers each containing an amino group in a molecule. Especially preferably used is a polymer having a primary amino group at the terminal ends, and is confirmed that a reaction with the isocyanate compound makes firmly adhesion.

Examples of polymers containing an amino group in a molecule include: polyethyleneimine; polyallylamine; polyvinylamine; polyvinylpyridine; polyvinylpyrrolidine; a polymer of an amino group-containing monomer such as dimethylaminoethyl acrylate. Among them, preferable is a polyethyleneimine.

The process of forming the anchor coat layer may also include mixing the amino group-containing polymer and a compound capable of reacting with the amino group-containing polymer so that crosslink may be formed to improve the strength of the anchor coat layer. The compound capable of reacting with the amino group-containing polymer may be an epoxy compound or the like.

The pressure-sensitive adhesive layer is formed after the anchor coat layer is formed on the optical film. For example, a solution of an anchor component, such as an aqueous solution of polyethyleneimine, may be applied by a method of application, such as coating, dipping or spraying, and dried to form an anchor coat layer. The thickness of the anchor coat layer is preferably from about 10 to about 5,000 nm, more preferably from 50 to 500 nm. If the anchor coat layer is too thin, it could fail to have properties as a bulk or fail to exhibit sufficient strength so that the resulting adhesion could be insufficient in some cases. If the anchor coat layer is too thick, the optical properties could be degraded.

In order to impart antistatic properties to the pressure-sensitive adhesive attached optical film, an antistatic agent may also be used. The antistatic agent may be added to each layer, or alternatively, an antistatic layer may be independently formed. Examples of the antistatic agent include ionic surfactants; electrically-conductive polymers such as polyaniline, polythiophene, polypyrrole, and polyquinoxaline; and metal oxides such as tin oxide, antimony oxide and indium oxide. In particular, electrically-conductive polymers are preferably used, in view of optical properties, appearance, antistatic effect, and stability of the antistatic effect during heating or humidifying. In particular, a water-soluble or dispersible electrically-conductive polymer such as polyaniline and polythiophene is preferably used, because when the water-soluble or dispersible electrically-conductive polymer is used as an antistatic layer-forming material in the coating process, an optical film substrate can be prevented from deteriorating due to an organic solvent.

The optical film for use in the pressure-sensitive adhesive attached optical film of the invention may be any type of film that has been used to form image displays such as liquid crystal displays. For example, the optical film serves as a polarizing plate. A polarizing plate comprising a polarizer and a transparent protective film provided on one side or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared on one side or both sides of the above-mentioned polarizer, with outstanding transparency, mechanical strength, heat stability, moisture cover property, isotropy, etc. may be preferable. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. The transparent protective film can be formed as a cured layer made of heat curing type or ultraviolet ray curing type resins, such as acryl based, urethane based, acryl urethane based, epoxy based, and silicone based.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protective film, which can be determined arbitrarily, is 1 to 500 µm, especially 5 to 200 µm in viewpoint of strength, work handling and thin layer.

The protective film is preferably as colorless as possible. Thus, a protective film is preferably used which has a film-thickness-direction retardation of −90 nm to +75 nm, wherein the retardation (Rth) is represented by the formula: Rth= [(nx+ny)/(2−nz)]d, wherein nx and ny are each a principal refractive index in the plane of the film, nz is a refractive index in the film-thickness direction, and d is the thickness of the film. If a protective film with such a thickness-direction retardation value (Rth) of −90 nm to +75 nm is used, coloring (optical coloring) of the polarizing plate can be almost avoided, which could otherwise be caused by any other protective film. The thickness-direction retardation (Rth) is more preferably from −80 nm to +60 nm, particularly preferably from −70 nm to +45 nm.

As the protective film, if polarization property and durability are taken into consideration, cellulose based polymer, such as triacetyl cellulose, is preferable, and especially triacetyl cellulose film is suitable. Thermoplastic saturated norbornene resins may also be used, which do not easily have retardation even when stress is applied thereto due to a dimensional change of a polarizer. The thermoplastic saturated norbornene resins have a cycloolefin main skeleton and do not substantially have a carbon-carbon double bond. Examples of the thermoplastic saturated norbornene resins include Zeonex and Zeonor series manufactured by Zeon Corporation and Arton series manufactured by JSR Corporation.

In addition, when the protective films are provided on both sides of the polarizer, the protective films comprising same polymer material may be used on both of a front side and a back side, and the protective films comprising different polymer materials etc. may be used.

The polarizer and the protective film are bonded with an aqueous adhesive. The aqueous adhesive includes isocyanate based adhesives, polyvinyl alcohol based adhesives, gelatin based adhesives, vinyl based latex based, aqueous polyester based adhesives, and the likes.

As the opposite side of the polarizing-adhering surface above-mentioned transparent protective film, a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

Further an optical film of the invention may be used as other optical layers, such as a reflective plate, a transflective plate, a retardation plate (a half wavelength plate and a quarter wavelength plate included), and a viewing angle compensation film, which may be used for formation of a liquid crystal display etc. These are used in practice as an optical film, or as one layer or two layers or more of optical layers laminated with polarizing plate.

Especially preferable polarizing plates are; a reflection type polarization plate or a transflective type polarization plate in which a reflective plate or a transflective reflective plate is further laminated onto a polarizing plate of the invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from 0.5 to 150 μm, further 0.5 to 50 μm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyallyl sulfones, polyvinyl alcohols, polyamides, polyimides, polyolefins, polyvinyl chlorides, cellulose type polymers, or bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bidirectional stretching and a biaxially stretched film as inclined orientation film etc. may be used. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

The pressure-sensitive adhesive of the invention is preferably used for optical films whose peripheral portion is particularly susceptible to unevenness, such as discotic liquid crystal layer-containing viewing angle expanding films and films that are formed by coating so as to have a retardation function.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as a pressure-sensitive adhesive layer, may be used for laminating. On the occasion of adhesion of the above described polarizing plate and other optical films, the optical axis may be set as a suitable configuration angle according to the target retardation characteristics etc.

The pressure-sensitive adhesive attached optical film of the invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive attached optical film and optionally other components such as a lighting system and incorporating a driving circuit according to any conventional technique, except that the pressure-sensitive adhesive attached optical film of the invention is used. Any type of liquid crystal cell may also be used such as a TN type, an STN type and a π type.

Suitable liquid crystal displays, such as liquid crystal display with which the above pressure-sensitive adhesive attached optical film has been located at one side or both sides of the liquid crystal cell, and with which a backlight or a reflective plate is used for a lighting system may be manufactured. In this case, the optical film by the invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

EXAMPLES

The invention is more specifically described using examples below, which are not intended to limit the scope of the invention.

Example 1

A four-neck flask equipped with a condenser tube, a stirring blade and a thermometer was charged with 95 parts by weight of butyl acrylate, 4 parts by weight of acrylic acid, 1 part by weight of N-(2-hydroxyethyl)acrylamide, 0.2 part by weight of benzoyl peroxide, and 200 parts by weight of toluene. After the air was sufficiently replaced with nitrogen, the mixture reacted at about 60° C. for 8 hours, while stirred under a nitrogen gas stream, so that a solution of acrylic copolymers with a weight average molecular weight of 1,800,000 (polystyrene-equivalent molecular weight measured by GPC) was obtained. Based on 100 parts by weight of the solids in the acrylic copolymer solution, 0.5 parts by weight (in terms of solid) of an isocyanate crosslinking agent (Coronate L manufactured by Nippon Polyurethane Industry Co., Ltd) was added to the acrylic copolymer solution to form a pressure-sensitive adhesive solution.

Examples 2 to 12 and Comparative Examples 1 to 4

Pressure-sensitive adhesive solutions were prepared in the same matter as in Example 1, except that the type or the amount of the monomer components was changed as shown in Table 1.

The pressure-sensitive adhesive solution obtained in each of Examples and Comparative Examples was applied by reverse roll coating to a separator made of a release-treated polyester film (38 μm in thickness) such that the pressure-sensitive adhesive layer would have a thickness of 20 μm after drying, and then heated at 155° C. for 3 minutes for solvent vaporization to obtain a pressure-sensitive adhesive layer. The pressure-sensitive adhesive layer was placed on a polarization plate with a viewing angle expanding film (NWF-LESEG type manufactured by Nitto Denko Corporation) to form a pressure-sensitive adhesive attached optical film. The polarization plate with a viewing angle expanding film was one in which a liquid crystal layer as a viewing angle expanding film was placed on the polarization plate with an adhesive interposed therebetween, and the pressure-sensitive adhesive layer was placed on the surface of the viewing angle expanding film.

The resulting pressure-sensitive adhesive attached optical films were each evaluated as described below. The results are shown in Table 1.

<Unevenness>

Each pressure-sensitive adhesive attached optical film was cut at an angle of 135° with respect to the absorption axis of the polarization plate to give two 17 inch-size pieces. The pressure-sensitive adhesive attached optical films were adhered to the front and back sides of a glass plate in the crossed-Nicol configuration with a laminator and then autoclaved at 5 atm and 50° C. for 15 minutes. The product was defined as being in an initial state. The product was then heated at 60° C. for 24 hours. The heated product was defined as being in a heated state. The optical film pieces in each of the initial state and the heated state were placed on a backlight, and they were visually evaluated for peripheral unevenness according to the following criteria: o, there was no unevenness in the peripheral portion; x, there was unevenness in the peripheral portion.

<Measurement of Adhesive Strength>

The pressure-sensitive adhesive attached optical film was adhered to a retardation plate (a norbornene film, Arton (trade name) manufactured by JSR Corporation), and the resulting laminate was then cut into a 25 mm×150 mm piece, which was measured for adhesive strength with a tensile tester at a peel angle of 90° and a peel rate of 300 mm/minute.

TABLE 1

| | Monomer Components and Their Content (parts by weight) | | | | | | | Evaluations | | Adhesive Strength |
|---|---|---|---|---|---|---|---|---|---|---|
| | Monomer (a1) | | Monomer (a2) | | Monomer (a3) | | | Unevenness | After | (N/25 |
| | BA | 2EHA | HEAA | AA | ACMO | DMAA | HEA | Initial | Heating | mm) |
| Example 1 | 95 | — | 1 | 4 | — | — | — | ○ | ○ | 11 |
| Example 2 | — | 95 | 1 | 4 | — | — | — | ○ | ○ | 10 |
| Example 3 | 91.5 | — | 0.5 | 3 | 5 | — | — | ○ | ○ | 15 |
| Example 4 | — | 91.5 | 0.5 | 3 | 5 | — | — | ○ | ○ | 14 |
| Example 5 | 91 | — | 1.5 | 3 | — | 4.5 | — | ○ | ○ | 11 |
| Example 6 | — | 91 | 1.5 | 3 | — | 4.5 | — | ○ | ○ | 10 |
| Example 7 | 94 | — | 1 | — | — | 5 | — | ○ | ○ | 8 |
| Example 8 | — | 94 | 1 | — | — | 5 | — | ○ | ○ | 9 |
| Example 9 | 96 | — | 0.05 | 3.95 | — | — | — | ○ | ○ | 11 |
| Example 10 | 95 | — | 0.07 | 1.93 | 3 | — | — | ○ | ○ | 13 |
| Example 11 | 95 | — | 4.5 | 0.5 | — | — | — | ○ | ○ | 10 |
| Example 12 | 85 | — | 14.5 | 0.5 | — | — | — | ○ | ○ | 9 |
| Comparative Example 1 | 95 | — | — | 4 | — | — | — | ○ | x | 9 |
| Comparative Example 2 | — | 95 | — | 4 | — | — | 1 | ○ | x | 12 |
| Comparative Example 3 | 91.5 | — | — | 3 | 5 | — | — | ○ | x | 14 |
| Comparative Example 4 | 91.5 | — | — | 3 | 5 | — | 0.5 | ○ | x | 12 |

In Table 1, BA represents n-butyl acrylate, 2EHA 2-ethylhexyl acrylate, HEAA N-(2-hydroxyethyl)acrylamide, AA acrylic acid, ACMO N-acryloylmorpholine, DMAA N,N-dimethylacrylamide, and HEA 2-hydroxyethyl acrylate.

All Examples and the Comparative Examples in the initial state were evaluated as "o" and had no unevenness in the peripheral portion. Examples in the heated state were also evaluated as "o." In contrast, all Comparative Examples in the heated state were evaluated as "x" and observed to have unevenness in the peripheral portion, because Comparative Example 1 or 3 did not use HEAA and Comparative Example 2 or 4 used HEA as the hydroxyl group-containing monomer in place of HEAA.

The invention claimed is:

1. A pressure-sensitive adhesive attached optical film, comprising:
   an optical film, wherein the optical film is a polarizing plate, a retardation plate, an optical compensation film, a brightness enhancement film, or a laminate thereof, and
   a first pressure-sensitive adhesive layer placed directly on at least one side of the optical film,
   wherein the first pressure-sensitive adhesive layer comprises an optical pressure-sensitive adhesive,
   wherein the optical pressure-sensitive adhesive comprises an acrylic copolymer comprising an alkyl (meth)acrylate (a1), N-(2-hydroxyethyl)(meth)acrylamide (a2), and a monomer (a3) other than the components (a1) and (a2), as a monomer unit; and a crosslinking agent, wherein the crosslinking agent is an isocyanate compound,
   wherein a content of the N-(2-hydroxyethyl)(meth)acrylamide (a2) is 0.01 to 5 parts by weight based on 100 parts by weight of the alkyl (meth)acrylate (a1), and the acrylic copolymer has a weight average molecular weight of 300,000 to 2,500,000,
   wherein the alkyl (meth)acrylate (a1) comprises n-butyl acrylate or 2-ethylhexyl acrylate,
   wherein the monomer (a3) comprises a carboxyl group-containing monomer, and
   wherein a content of the monomer (a3) is 50 parts by weight or less based on 100 parts by weight of the alkyl (meth)acrylate (a1).

2. The pressure-sensitive adhesive attached optical film according to claim 1,
   wherein the monomer (a3) comprises a nitrogen-containing vinyl monomer.

3. The pressure-sensitive adhesive attached optical film according to claim 2,
   wherein the nitrogen-containing vinyl monomer is selected from the group consisting of maleimide, N-cyclohexylmaleimide, N-phenylmaleimide, N-acryloylmorpholine, (meth)acrylamide, N,N-dimethyl(meth)acrylamide, N,N-diethyl(meth)acrylamide,N -hexyl(meth) acrylamide, N-methyl(meth)acrylamide, N-butyl(meth)acrylamide, N-methylol(meth)acrylamide, N-methylolpropane(meth)acrylamide, aminoethyl (meth)acrylate, aminopropyl (meth)acrylate, N,N-dimethylaminoethyl (meth)acrylate, tert-butylaminoethyl (meth)acrylate, 3-(3-pyrinidyl)propyl (meth)acrylate,N -(meth)acryloyloxymethylenesuccinimide, N-(meth)acryloyl-6-oxyhexamethylenesuccinimide, and N-(meth)acryloyl-8-oxyoctamethylenesuccinimide.

4. The pressure-sensitive adhesive attached optical film according to claim 2,
   wherein the amount of the nitrogen-containing vinyl monomer is 0.1 to 10 parts by weight based on 100 parts by weight of the alkyl (meth)acrylate (a1).

5. The pressure-sensitive adhesive attached optical film according to claim 1,
   wherein the optical film comprises a polarization plate and/or a retardation plate.

6. An image display comprising the pressure-sensitive adhesive attached optical film according to claim 1.

7. The pressure-sensitive adhesive attached optical film according to claim 1,
   wherein the first pressure sensitive adhesive layer and a second pressure sensitive adhesive layer are placed directly on opposite sides of the optical film.

8. The pressure-sensitive adhesive attached optical film according to claim 1,
   wherein the content of the N-(2-hydroxyethyl)(meth)acrylamide (a2) is 0.05 to 5 parts by weight based on 100 parts by weight of the alkyl (meth)acrylate (a1).

9. The pressure-sensitive adhesive attached optical film according to claim 1,
   wherein the content of the monomer (a3) is up to 20 parts by weight based on 100 parts by weight of the alkyl (meth)acrylate (a1).

10. The pressure-sensitive adhesive attached optical film according to claim 1,
    wherein an amount of the carboxyl group-containing monomer is 0.1 to 10 parts by weight based on 100 parts by weight of the alkyl (meth)acrylate (a1).

11. The pressure-sensitive adhesive attached optical film according to claim 1,
    wherein the crosslinking agent is an isocyanate crosslinking agent selected from the group consisting of tolylene diisocyanate, chlorophenylene diisocyanate, hexamethylene diisocyanate, tetramethylene diisocyanate, isophorone diisocyanate, xylylene diisocyanate, diphenylmethane diisocyanate and hydrogenated diphenylmethane diisocyanate.

12. The pressure-sensitive adhesive attached optical film according to claim 1,
    wherein the amount of crosslinking agent is up to 10 parts by weight based on 100 parts by weight of the acrylic copolymer.

13. The pressure-sensitive adhesive attached optical film according to claim 1,
    wherein an anchor coat layer is placed directly on a side of the optical film.

14. The pressure-sensitive adhesive attached optical film according to claim 1,
    wherein an anchor coat layer is placed directly on a side of the optical film and a second pressure sensitive adhesive layer is placed directly on the anchor coat layer, and
    wherein the second pressure-sensitive adhesive layer comprises the optical pressure-sensitive adhesive.

15. The pressure-sensitive adhesive attached optical film according to claim 1, wherein the carboxyl group-containing monomer comprises acrylic acid.

16. A pressure-sensitive adhesive attached optical film, comprising:
    an optical film, wherein the optical film is a polarizing plate, a retardation plate, an optical compensation film, a brightness enhancement film, or a laminate thereof, and
    a pressure-sensitive adhesive layer placed directly on at least one side of the optical film,
    wherein the pressure-sensitive adhesive layer is formed of an optical pressure-sensitive adhesive,
    wherein the optical pressure-sensitive adhesive consists essentially of an acrylic copolymer containing an alkyl (meth)acrylate (a1), N-(2-hydroxyethyl)(meth)acrylamide (a2), and a monomer (a3) other than the components (a1) and (a2), as a monomer unit; and a crosslinking agent, wherein the crosslinking agent is an isocyanate compound,
    wherein a content of the N-(2-hydroxyethyl)(meth)acrylamide (a2) is 0.01 to 5 parts by weight based on 100 parts by weight of the alkyl (meth)acrylate (a1),
    wherein the alkyl (meth)acrylate (a1) comprises n-butyl acrylate or 2-ethylhexyl acrylate,
    wherein the monomer (a3) comprises a carboxyl group-containing monomer, and wherein a content of the monomer (a3) is 50 parts by weight or less based on 100 parts by weight of the alkyl (meth)acrylate (a1).

17. The pressure-sensitive adhesive attached optical film according to claim 16, wherein the carboxyl group-containing monomer comprises acrylic acid.

* * * * *